United States Patent
Tonohara (10) Patent No.: US 7,972,547 B2
(45) Date of Patent: Jul. 5, 2011

(54) SOLUTION CASTING METHOD

(75) Inventor: Kouji Tonohara, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 511 days.

(21) Appl. No.: 12/067,605

(22) PCT Filed: Sep. 20, 2006

(86) PCT No.: PCT/JP2006/319087
§ 371 (c)(1),
(2), (4) Date: Mar. 20, 2008

(87) PCT Pub. No.: WO2007/034969
PCT Pub. Date: Mar. 29, 2007

(65) Prior Publication Data
US 2010/0148392 A1    Jun. 17, 2010

(30) Foreign Application Priority Data

Sep. 21, 2005  (JP) .................................. 2005-273538

(51) Int. Cl.
*B29D 7/00*  (2006.01)
(52) U.S. Cl. ...................................................... 264/217
(58) Field of Classification Search .................... 264/217
See application file for complete search history.

(56) References Cited

U.S. PATENT DOCUMENTS

| | | | | |
|---|---|---|---|---|
| 4,330,499 A | * | 5/1982 | von und zu Aufsess et al. | 264/289.6 |
| 6,476,892 B2 | * | 11/2002 | Aminaka | 349/117 |
| 6,814,914 B2 | * | 11/2004 | Tasaka et al. | 264/217 |

FOREIGN PATENT DOCUMENTS

| | | |
|---|---|---|
| JP | 2000-309051 A | 11/2000 |
| JP | 2001-001745 A | 3/2001 |
| JP | 2001-188128 A | 7/2001 |
| JP | 2004-136613 A | 5/2004 |
| JP | 2004136613 A * | 5/2004 |
| JP | 2004-195875 A | 7/2004 |
| JP | 2004195875 A * | 7/2004 |
| JP | 2005-181747 A | 7/2005 |

OTHER PUBLICATIONS

CN Second Office Action, dated May 13, 2010, issued in corresponding CN Application No. 200680034657.3, 8 pages.

* cited by examiner

*Primary Examiner* — Yogendra N Gupta
*Assistant Examiner* — Alison Hindenlang
(74) *Attorney, Agent, or Firm* — Sughrue Mion, PLLC (57) ABSTRACT

A casting dope (27) prepared from CAP, additive and solvent is cast onto a belt (46) and peeled as a wet film (74) that is drawn in the longitudinal direction in a transporting area (80). In a tenter device (47), while the wet film (74) is stretched in the widthwise direction, a relaxation of the wet film (74) in the longitudinal direction is made. If an extent percentage of the stretch is less than 70%, the relation is started. The wet film (74) is fed out as a polymer film (82) from the tenter device (47). On the polymer film (82), the in-plane retardation increases and the thickness retardation decreases. Thus the optical properties become preferable.

7 Claims, 5 Drawing Sheets

SOLUTION CASTING METHOD

TECHNICAL FIELD

The present invention relates to a solution casting method.

BACKGROUND ART

A cellulose acylate film is formed from cellulose acylate. In the production of the cellulose acylate film, cellulose triacetate (hereinafter TAC) is used as cellulose acylate for forming a TAC film, while the averaged acetylation degree of TAC is in the range of 57.5% to 62.5%. The TAC film is used as a film base of a film material, such as a photosensitive material, since having strength and inflammability. Further, the TAC film is excellent in optical isotropy, and therefore used as an a protective film in a liquid crystal display whose market becomes larger in recent years, and the like.

The TAC film is usually produced by a solution casting method, in which the produced film is more excellent in physical properties such as optical properties and the like than other film production method such as a melt extrusion method and the like. When it is designated to perform the solution casting method, polymer is dissolved in a mixture solvent in which dichloromethane or methyl acylate is the main solvent component, so as to prepare a polymer solution (hereinafter, dope). The dope is cast from a casting die onto a support while a bead of the cast is formed between the casting die and the support. Thus a casting film is formed from the dope on the support. When the casting film has a self-supporting property, the casting film is peeled as a wet film from the support and dried to be a film. Thereafter the film is wound up. (cf: Japan Institute of Invention and Innovation (JIII) Journal of Technical Disclosure No. 2001-1745)

Further, in the melt extrusion method, in order to obtain the produced film having an adequate optical isotropy, the stretch of the film in a widthwise direction and the relaxation thereof in a longitudinal direction are made (see, Japanese Patent Laid Open Publication No. 2000-309051). By performing both of the relaxation and the stretch, the birefringency of the film is controlled. The film having the birefringency is preferably used for an optical film to be provided in a liquid crystal display. The stretch and relaxation of the film is made by a tenter device (also called tenter dryer). Further, in order to obtain the adequate birefrigency of the film, it is effective to adjust the increase and decrease of the stretch ratio and control the film temperature. And further, in the solution casting method, it is especially effective to adjust the content of the remaining solvent in the film.

By the way, it is necessary for the optical functional film, especially the protective film of the polarizing filter to provide with not only high transparency and high strength but also high heat resistance. If the heat resistance of the protective film is not enough, the shrinkage and the deterioration of the protective film easily occurs under the high temperature and high humidity, and otherwise the deterioration and the like of the adhesive agent layer between the protective film and a glass plate of a liquid crystal cell. The shrinkage, the deterioration and the like causes the peeling of the protective film from the glass plate.

Therefore, there is a method in which other polymer is used than TAC in order to increase the moisture resistance and the heat resistance of the film to be produced by the solution casting method. For example, for the acylation of the cellulose, as described in Japanese Patent Laid Open Publication No. 2001-188128, the acylations of acetyl group (—CO—CH$_3$) and propionyl group (CO—C$_2$H$_5$) are made such that cellulose acylate propionate (hereinafter CAP) may be produced, and then the CAP is used as a raw material of the film. CAP has a longer side chain acyl group than TAC, and thus has a larger lipophilic property (nonhydrophilic property). Therefore the dissolubility to the organic solvent becomes larger and the production of the dope becomes easily.

The liquid crystal display of VA (vertically aligned) made with the optical compensation property is used in recent years. In order to realize a high speed responsiveness of the liquid crystal display, a technique for narrowing a gap (cell gap) between glass plates for sandwiching liquid crystal molecules is used. This technique is effective in view of making optical compensation since the in-plane retardation (Re) of the film becomes larger. However, the thickness retardation (Rth) also increases at the almost same ratio as Re, and therefore the thickness retardation (Rth) becomes too large in comparison to the cell gap. Thus the optical property of the liquid crystal display becomes worse.

In the Publication No. 2000-309051, the stretch in the widthwise direction (TD direction) and the relaxation in the longitudinal direction (MD direction) are made at the same time, and thus the optical property of the film, especially the control of the refractive index is described. However, the object of performing the above method is to reduce the occurrence of the bowing phenomena of the film, and the adjustment of the birefringency is not described.

In the Publication No. 2001-188128, the protective film can be produced so as to have high heat resistance. In this case, however, the film is produced from CAP under the almost same conditions as from TAC, and therefore the in-plane retardation Re becomes larger. Thus the thickness retardation Rth becomes too large. Further, since if the stretch ratio becomes too large, the film rupture and the film bleaching causing the bad optical property occurs. Therefore, there is an upper limit of the stretch ratio. In order to resolve these problems, the addition of the refractive index controller is supposed. However, the amount of adding the refractive index controller is limited such that the optical property of the film may not be bad.

An object of the present invention is to provide a solution casting method for producing a film in which both of the in-plane retardation is increased and the thickness retardation is decreased.

DISCLOSURE OF INVENTION

In order to achieve the object and the other object, in a solution casting method, a casting dope containing polymer and solvent is cast from a casting die onto a support, so as to form a casting film, and the casting film is peeled as a film from the support, and then dried. Thereafter, the film is stretched in a widthwise direction, and then a relaxation of the film in a longitudinal direction is performed during the stretch.

Preferably, before the stretch ratio becomes to 70% of an objected value, the relaxation is started.

Preferably, a relaxation ratio of said film by the relaxation in said widthwise direction is in the range of 1% to 5%.

Preferably, when a content of remaining solvent in said film after the drying is in the range of 5 wt. % to 150 wt. % on the dry basis, the relaxation of the film is started.

Preferably, a stretch ratio of the stretch is in the range of 10% to 40% of the film width at starting the stretch.

Preferably, the polymer is at least one of cellulose triacetate, cellulose acetate propionate, and cellulose acetate butylate. Especially preferably, an in-plane retardation Re of said film is in the range of 5 nm to 150 nm and a thickness retardation Rth is in the range of 40 nm to 250 nm.

Preferably, the film is used for an optical functional film.

The inventor found in research for the present invention that the produced film has a predetermined birefringence when the relaxation in the longitudinal direction is made during the stretch in the widthwise direction. In this case, in order to reduce the tension in the longitudinal direction by the stretch in the widthwise direction, it is necessary to start the relaxation in the longitudinal direction before an elasticity of the raw materials in the widthwise direction becomes more than the elasticity limit. Thus the polymer molecules are stretched in the widthwise direction and shrinks in the lengthwise direction, and therefore, the produced film has the birefringence, whose level is not realized before.

According to the solution casting method of the present invention, in which the casting dope containing polymer and solvent is cast from the casting die onto the support, so as to form the casting film, the casting film is peeled as the film from the support, the casting dope containing polymer and solvent is cast from the casting die onto the support, so as to form the casting film, and the casting film is peeled as the film from the support and dried such that the film may be obtained, the relaxation of the film in the longitudinal direction is performed during the stretch. Although the tension to the film also occurs in the longitudinal direction during the stretch in the widthwise direction, the excess tension in the longitudinal direction is reduced. Therefore, while the stretch of the polymer molecules in the widthwise direction is made, the shrinkage of the polymer molecules in the longitudinal direction is made. Thus the in-plane retardation Re is large and the thickness retardation Rth is small.

It is necessary to start the relaxation in the longitudinal direction described above, when the materials of the film has an elasticity. Concretely in the solution casting method, when a difference of the film width during the stretch of the film from that before the stretch is less than 70% of the objected value, it is preferably to start the relaxation. Therefore, the in-plane and thickness retardations Re, Rth, and a retardation rate (Re/Rth) become predetermined values. Otherwise, when a difference of the film width during the stretch of the film from that before the stretch is at least 70% of the objected value, it is not preferable to start the relaxation. In this case, the produced film hardly has the high retardation rate (Re/Rth). In the present invention, the relaxation ratio of the film by the relaxation in the widthwise direction is in the range of 1% to 5%. Therefore the influences on the film transportation are small. Furthermore, the difference of the film width between starting and ending the stretch of the film is in the range of 10% to 40% of the film width at starting the stretch. Therefore, the transparency of the film doesn't become lower. Therefore, the film is adequately used for the optical functional film.

BEST MODE FOR CARRYING OUT THE INVENTION

Polymers already known can be used for producing, a film by a solution casting method. Therefore, all sorts of the polymers can be used in the present invention.

The polymer used in the present invention is cellulose ester. As for cellulose ester, it is preferable to satisfy all of following formulae (I)-(II).

$$2.5 \leq A+B \leq 3.0 \quad (I)$$

$$1.25 \leq B \leq 3.0 \quad (II)$$

In these formulae (I)-(II), A is the degree of substitution of the acyl group (—CO—R) for the hydrogen atoms on the hydroxyl groups of cellulose, and B is the degree of substitution of the propionyl group (—CO—$C_2H_5$), butyryl group (—CO—$C_3H_7$), pentanoyl groups (—CO—$C_4H_9$) and hexanoyl groups (—CO—$C_5H_{11}$) for the hydrogen atoms on the hydroxyl groups of cellulose. If B is propionyl group, the cellulose ester is called CAP (cellulose acetate propionate), and if B is butyryl group, the cellulose ester is called CAB (cellulose acetate butylate). Further, the formula (II) is preferably $1.3 \leq B \leq 2.97$, and especially preferably $1.4 \leq B \leq 2.97$.

Preferably, at least 90 wt. % of CAP, CAB and the like is particles having a diameter in the range of 0.1 mm to 4 mm.

As solvent compounds for preparing the dope, there are aromatic hydrocarbons (for example, benzene, toluene and the like), hydrocarbon halides (for example, dichloromethane, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) and the like. It is to be noted in the present invention that the dope is a polymer solution or dispersion that is obtained by dissolving or dispersing the polymer in the solvent.

The solvent compounds are preferably hydrocarbon halides having 1 to 7 carbon atoms, and especially dichloromethane. Then in view of the solubility of CAP, the peelability of a casting film from a support, a mechanical strength of a film, optical properties of the film and the like, it is preferable that one or several sorts of alcohols having 1 to 5 carbon atoms is mixed with dichloromethane. Thereat the content of the alcohols to the entire solvent is preferably in the range of 2 wt. % to 25 wt. %, and particularly in the range of 5 wt. % to 20 wt. %. Concretely, there are methanol, ethanol, n-propanol, iso-propanol, n-butanol and the like. The preferable examples for the alcohols are methanol, ethanol, n-butanol, or a mixture thereof.

By the way, recently in order to reduce the effect to the environment to the minimum, the solvent composition when dichloromethane is not used is progressively considered. In order to achieve this object, ethers having 4 to 12 carbon atoms, ketones having 3 to 12 carbon atoms, esters having 3 to 12 carbon atoms, and alcohols having 1-12 carbon atoms are preferable, and a mixture thereof can be used. For example, as the mixture, there is a mixture of methyl acetate, acetone, ethanol and n-butanol. These ethers, ketones, esters and alcohols may have the ring structure. Further, the compounds having at least two of functional groups in ethers, ketones, esters and alcohols (namely, —O—, —CO—, —COO— and —OH) can be used for the solvent.

The detail explanation of cellulose acylate is made from [0140] to [0195] in Japanese Patent Laid-Open Publication No. 2005-104148. The description of this publication is also applied to the present invention. Further, there are for the additive several additive materials (such as the solvent, plasticizer, deterioration inhibitor, UV absorbing agent, optically anisotropic controller, retardation controller, dyne, matting agent, release agent, releasing accelerator and the like), which are described in detail from [0196] to [0516] of Japanese Patent Laid-Open Publication No. 2005-104148.

[Dope Production Method]

Figure 1:
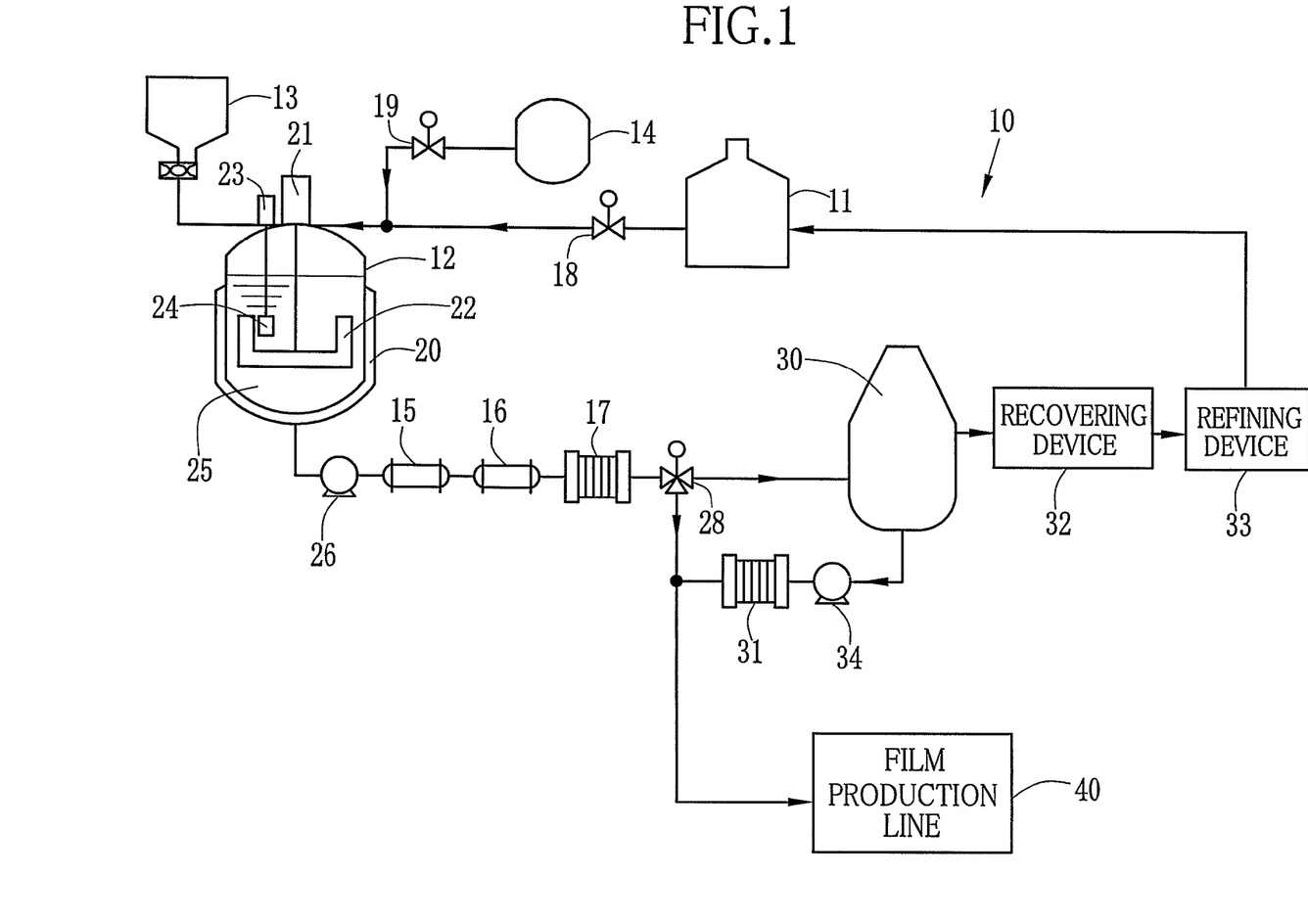
FIG. 1 is a schematic diagram of a dope production line for producing a casting dope to be used in a solution casting method of the present invention.

The dope is produced from the above raw materials. As shown in FIG. 1, a dope production line 10 is constructed of a solvent tank 11 for storing a solvent, a mixing tank 12 for mixing the CAP and the solvent therein, a hopper 13 for supplying the CAP and an additive tank 14 for storing an additive. Further, there is a heating device 15 for heating a swelling liquid (described below in detail), a temperature controlling device 16 for controlling the temperature of a prepared dope, and a filtration device 17. Further, there are a flushing device 30 for concentrating the dope and a filtration device 31. Further, there are a recovering device 32 for recovering a solvent vapor, and a refining device 33 for recycling the recovered solvent. The dope production line 10 is connected to a film production line 40. Note that the dope may be a solution in which the polymer is entirely dissolved and a swelling liquid in which the polymer is swollen.

In the dope production line 10, a casting dope 27 which is the dope to be used for the casting is produced in the following order. When a valve 18 is opened, the solvent is sent from the solvent tank 11 to the mixing tank 12. Then the CAP in the hopper 13 is sent to the mixing tank 12. Thereafter, a valve 19 is opened and closed such that a necessary amount of the additive may be sent from the additive tank 14 to the mixing tank 12.

The method of feeding the additive to the mixing tank is not restricted in the above description. If the additive is in the liquid state in the room temperature, it may be fed in the liquid state to the mixing tank 12 without preparing for the additive solution. Otherwise, if the additive is in the solid state in the room temperature, it may be fed in the solid state to the mixing tank 12 with use of a hopper. If plural sorts of additive compounds are used, the additive containing the plural additive compounds may be accumulated in the additive tank 14 altogether. Otherwise plural additive tanks may be used so as to contain the respective additive compounds, which are sent through independent pipes to the mixing tank 12.

In the above explanation, the solvent, the CAP, and the additive are sequentially sent to the mixing tank 12. However, the sending order is not restricted in it. For example, after the predetermined amount of the CAP is sent to the mixing tank 12, the feeding of the predetermined amount of the solvent and the additive may be performed to obtain a CAP solution. Otherwise, it is not necessary to feed the additive to the mixing tank previously, and the additive may be added to a mixture of CAP and solvent in following processes.

The mixing tank 12 is provided with a jacket 20 covering over an outer surface of the mixing tank 12, a first stirrer 22 to be rotated by a motor 21, and a second stirrer 24 to be rotated by a motor 23. The first stirrer 22 preferably has an anchor blade, and the second stirrer 24 is preferably an eccentric stirrer of a dissolver type. The jacket is provided with a temperature controlling device for controlling the temperature of a heat transfer medium flowing in the jacket 20. Thus the inner temperature in the mixing tank 12 is controlled. The preferable inner temperature is in the range of −10° C. to 55° C. At least one of the first and second stirrers 22, 24 is adequately chosen for performing the rotation. Thus a swelling liquid 25 in which CAP is swollen in the solvent is obtained.

A pump 26 is driven such that the swelling liquid 25 in the mixing tank 12 may be sent to the heating device 15 which is preferably a pipe with a jacket. Further, the heating device 15 preferably pressurizes the swelling liquid 25. While the swelling liquid 25 is continuously in only the heating condition or both of the heating and pressurizing condition, the dissolution of CAP proceeds such that the swelling liquid 25 may be the dope. Further, the temperature of the swelling liquid 25 is preferably in the range of 50° C. to 120° C. Instead of the heat-dissolution with use of the heating device 15, the swelling liquid 25 may be cooled in the range of −100° C. to −30° C. so as to perform the dissolution, which is already known as the cool-dissolution method. In this embodiment, one of the heat-dissolution and cool-dissolution methods can be chosen in accordance with the properties of the materials, so as to control the solubility. Thus the dissolution of CAP to the solvent can be made enough. The dope is fed to the temperature controlling device 16, so as to control the temperature nearly to the room temperature.

Then the dope is fed to the filtration device 17, such that impurities may be removed from the dope. The filter material of the filtration device 17 preferably has an averaged nominal diameter of at most 100 μm. The flow volume rate of the filtration in the filtration device 17 is preferably at least 50 liter/hr. The dope after the filtration is fed through a valve 28 to the film production line 40.

By the way, in the above method in which the dissolution of CAP is performed after the preparation of the swelling liquid, if it is designated that a dope of high concentration is produced, the time for production of the casting dope 27 to be used for the casting becomes longer. Consequently, the production cost becomes higher. Therefore, it is preferable that a dope of the lower concentration than the predetermined value is prepared at first and then the concentrating of the dope is made. In this embodiment, the dope after the filtration is sent to the flushing device 30 through the valve 28. In the flushing device 30, the solvent of the dope is partially evaporated. The solvent vapor generated in the evaporation is condensed by a condenser (not shown) to a liquid state, and recovered by the recovering device 32. The recovered solvent is recycled by the refining device 33 and reused. According to this method, the decrease of cost can be designated, since the production efficiency becomes higher and the solvent is reused.

The dope after the concentrating as the above description is extracted from the flushing device 30 through a pump 34. Further, in order to remove bubbles generated in the dope, it is preferable to perform the bubble removing treatment. As a method for removing the bubble, there are many methods which are already known, for example, an ultrasonic irradiation method and the like. Then the dope is fed to the filtration device 31, in which the undissolved materials are removed. Note that the temperature of the dope in the filtration device 31 is preferably in the range of 0° C. to 200° C. The dope after the filtration is sent to the film production line 40.

Thus a dope produced the produced dope preferably has the CAP concentration in the range of 5 wt. % to 40 wt. %, particularly 15 wt. % to 30 wt. %, and especially 17 mass % to 25 mass %. Further, the concentration of the additive (mainly plasticizer) is preferably in the range of 1 wt. % to 20 wt. %, if the solid content in the casting dope 27 is 100 wt. %.

Note that the method of producing the dope is disclosed in detail in [0517] to [0616] in Japanese Patent Laid-Open Publication No. 2005-104148, for example, the dissolution method and the adding methods of the materials, the raw materials and the additives in the solution casting method for forming the CAP film, the filtering method, the bubble removing method, and the like.

[Solution Casting Method]

Figure 2:
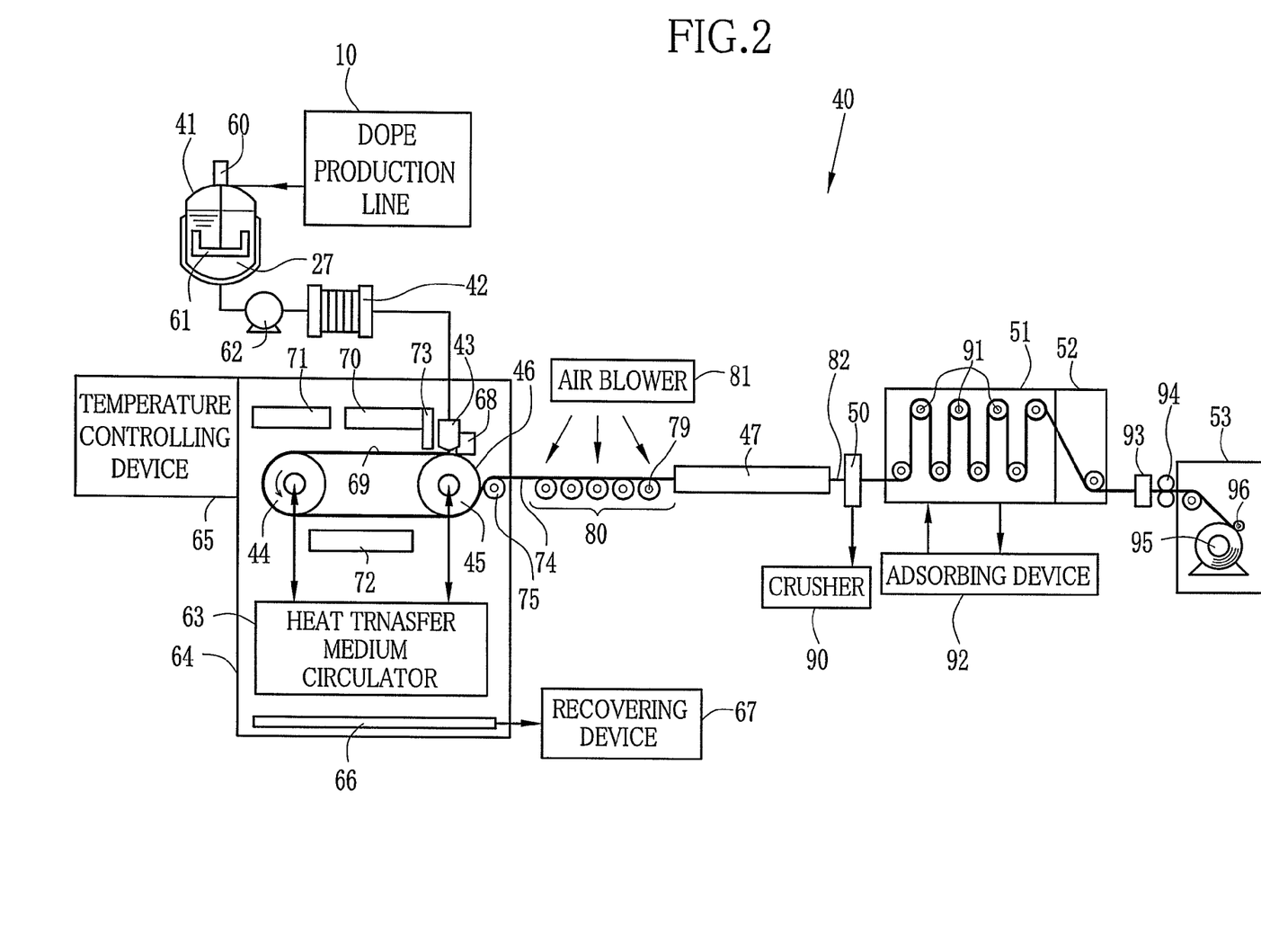
FIG. 2 is a schematic diagram of a solution casting line, to which the solution casting method of the present invention is applied.

An embodiment of the solution casting method will be described in reference with FIG. 2, now. However, the present invention is not restricted in the embodiment. As shown in FIG. 2, the film production line 40 includes a stock tank 41, a filtration device 42, a casting die 43, back-up rollers 44, 45, a belt supported by the back-up rollers 44, 45, and a tenter device 47. Further, there are an edge slitting device 50, a drying chamber 51, a cooling chamber 52 and a winding chamber 53.

In the stock tank 41, there is a stirrer 61 rotated by a motor 60. The stock tank 41 connects the dope production line 10 to the film production line 40, and thus connected to the casting die 43 through a pump 62 and the filtration device 42.

The materials of the casting die 43 are preferably precipitation hardening stainless steel. The preferable material has coefficient of thermal expansion of at most $2 \times 10^{-5} (° C.^{-1})$. Further, the material to be used has an anti-corrosion property, which is almost the same as SUS316, in the examination of forcible corrosion in the electrolyte solution. Preferably, the materials to be used for the casting die 43 has such resistance of corrosion that the pitting doesn't occur on the gas-liquid interface even if the material is dipped in a mixture of dichloromethane, methanol and water for three months. The casting die 43 is preferably manufactured by performing the polishing after a month from the material casting. Thus the surface condition of the dope flowing in the casting die 43 is kept uniform. The finish precision of a contact face of the casting die to casting dope 27 is at most 1 m in surface roughness and at most 1 μm/m in straightness. The clearance of a slit of the casting die 43 is automatically adjustable in the range of 0.5 mm to 3.5 mm. According to an edge of the contact portion of a lip end of the casting die 43 to the dope, R(R is chamfered radius) is at most 50 μm in all of a width. Further, the shearing rate in the casting die 43 is controlled in the range of 1 to 5000 per second.

A width of the casting die 43 is not restricted especially. However, the width is preferably at least 1.1 times and at most 2.0 times as large as a film width. Further, a temperature controller is preferably attached to the casting die 43 so as to control the temperature of the casting die 43 to a predetermined value during the film production. Furthermore, the casting die 43 is preferably a coat hanger type die. Further, in order to adjust a film thickness, the casting die 43 is preferably provided with an automatic thickness adjusting device. For example, thickness adjusting bolts (heat bolts) are disposed at a predetermined distance in a widthwise direction of the casting die 43. According to the heat bolts, it is preferable that the profile is set on the basis of a predetermined program, depending on feed rate of the pump (preferably, high accuracy gear pump) 62, while the film production is performed. Further, the film production line 40 may be provided with a thickness meter (not shown), such as infrared ray thickness meter and the like. In this case, the feed back control of the adjustment value of the heat bolts may be made by the adjusting program on the base of the profile of the thickness meter. The thickness difference between any two points in the widthwise direction except the side edge portions in a casting film 69 is controlled preferably to at most 1 μm. The difference between the maximum and the minimum of the thickness in the widthwise direction is at most 3 μm, and especially at most 2 μm. Further, the accuracy to the designated object value of the thickness is preferably in ±1.5 μm.

Preferably, a hardened layer is preferably formed on a top of a lip end of the casting die 43. A method of forming the hardened layer is not restricted. But it is, for example, ceramics hard coating, hard chrome plating, neutralization processing, and the like. If ceramics is used as the hardened layer, it is preferable that the used ceramics is grindable but not friable, with a lower porosity, high resistance of corrosion, and poor adhesiveness to the casting die 43. Concretely, there are tungsten carbide (WC), $Al_2O_3$, TiN, $Cr_2O_3$, and the like. Especially preferable ceramics is tungsten carbide. Tungsten carbide coating can be made by a spraying method.

Further, in order to prevent the partial dry-solidifying of the casting dope 27 flowing on slit ends of the casting die 43, it is preferable to provide a solvent supplying device (not shown) at the slit ends, on which a gas-liquid interfaces are formed between both edges of the slit and between both bead edges and the outer gas. Preferably, these gas-liquid interfaces are supplied with the solvent which can dissolve the dope, (for example a mixture solvent of dichloromethane 86.5 pts. wt., acetone 13 pts. wt., n-butanol 0.5 pts. wt.). The supply rate to each slit end is preferably in the range of 0.1 mL/min to 1.0 mL/min, in order to prevent the foreign materials from mixing into the casting film. Note that the pump for supplying the solvent has a pulse rate (or ripple factor) at most 5%.

A casting belt 46 is positioned below the casting die 43, and lapped on back-up rollers 44, 45. When the back-up rollers 44, 45 are rotated by the driving device (not shown), and thus the casting belt 46 runs endlessly in accordance with the rotation of the back-up rollers 44, 45. Then the casting speed is preferably in the range of 10 m/min to 200 m/min. Further, the temperatures of the back-up rollers 44, 45 are controlled by a heat transfer medium circulator 63 for cycling a heat transfer medium. It is preferable that the surface temperature of the casting belt 46 is adjusted in the range of -20° C. to 40° C. by heat transmission from the back-up rollers 44, 45. In this embodiment, paths (not shown) of the heat transfer mediums are formed in the back-up rollers 44, 45, and the heat transfer mediums whose temperatures are controlled by the heat transfer medium circulator 63 pass through the paths. Thus the temperature of the back-up rollers 44, 45 are kept to the predetermined values.

The width, the length and the material of the casting belt 46 are not restricted especially. However, it is preferably 1.1 to 2.0 times as large as the casting width. Preferably, the length is from 20 m to 250 m, and the thickness is from 0.5 mm to 2.5 mm. The surface is preferably polished so as to have a surface roughness at most 0.05 μm. The casting belt 46 is preferably made of stainless steel, and especially of SUS 316 so as to have enough resistance of corrosion and strength. The thickness unevenness of the entire casting belt 46 is preferably at most 0.5%.

Note that it is possible to use one of the back-up rollers 44, 45 as support. In this case, the back-up roller used as support is preferably rotated at high accuracy such that a rotation flutter may be at most 0.2 mm. Therefore the surface roughness is preferably at most 0.01 μm. Further, the chrome plating is preferably performed to the drum such that the drum may have enough hardness and endurance. As described above, it is preferable in the support that the surface defect must be reduced to be minimal. Concretely there are no pin hole of at least 30 μm, at most one pin hole in the range of 10 μm to 30 μm, and at most two pin holes of less than 10 μm per 1 $m^2$.

There is a temperature controlling device 65 for controlling the inner temperature of a casting chamber 64 to the predetermined value and a condenser 66 for condensing organic solvent evaporated in the casting chamber 64. Further a recovering device 67 for recovering the condensed organic solvent outside the casting chamber 64. Further, the cast dope forms a bead between the casting die 43 and the casting belt 46. In order control the pressure in a rear side of the bead, it is preferable to dispose a decompression chamber 68, as in this embodiment.

Air ducts 70, 71, 72 are disposed around and near the casting belt 46, so as to feed out through outlets drying airs for drying the casting film 69 formed on the casting belt 46. Further, an air shielding plate 73 is preferably disposed at the outlet of an air duct 70 near the casting die 43, so as to control the surface condition variation of the casting film 69 that is caused by applying the drying air to the casting film 69 just after the formation thereof.

In a transfer area 80 having many rollers 79, there is an air blower 81. The rollers 79 feed toward the tenter device 47 the wet film 74 peeled from the peel roller 75. In the transport area 80, the drying air at the predetermined temperature is fed out from the air blower 81, so as to dry the wet film 74 furthermore. It is preferable that the temperature of the drying air is in the range of 20° C. to 250° C. In the transfer area 80, it is also set the rotation speed of the rollers 79 so as to become higher in the downstream side. In this case, a draw tension is applied to the wet film 74.

In the tenter device 47, not only the drying but also the stretch and the relaxation of the wet film 74 are made. The explanation about the tenter device 47 and the processes to be performed in the tenter device 47 will be made later. In a down stream from the tenter device 47 is disposed the edge slitting device 50 for slitting off both side edge portions of the polymer film 82 into tips, and the tips of both side edge portions are crushed by a crusher 90 connected to the edge slitting device 50.

In the drying chamber 51, the polymer film 82 is transported with lapping on rollers 91. The solvent vapor evaporated from the polymer film 82 by the drying chamber 51 is adsorbed and recovered to the mixture solvent by a recovering device 92.

The polymer film 82 is transported into the cooling chamber 52, and cooled therein to around the room temperature. A humidity control chamber (not shown) may be provided for conditioning the humidity between the drying chamber 51 and the cooling chamber 52. In a downstream from the cooling chamber 52, a compulsory neutralization device (or a neutralization bar) 93 eliminates the charged electrostatic potential of the polymer film 82 to the predetermined value (for example, in the range of −3 kV to +3 kV). The position of the neutralization process is not restricted in this embodiment. For example, the position may be a predetermined position in the drying section or in the downstream side from a knurling roller 94, and otherwise, the neutralization may be made at plural positions. In the winding chamber 53, the polymer film 82 is wound by the winding shaft 95. At this moment, a tension is applied at the predetermined value to a press roller 96.

In followings, an embodiment of a method for producing the polymer film 82 in the film production line 40 will be explained. Note that the present invention is not restricted in it. The casting dope 27 is always made uniform by rotating the stirrer 61. Also in the stirring, the additive (for example, plasticizer and the UV-absorbing agent and the like) can be mixed.

The pump 62 is driven to feed the casting dope 27 to the filtration device 42, and then filtration is made. Thereafter the casting dope 27 is cast from the casting die 43 onto the casting belt 46 to form the casting film 69. The drive of the back-up rollers 44, 45 is controlled such that the tension generating in the casting belt 46 may be in the range of $10^4$ N/m to $10^5$ N/m. Further, the relative speed between the casting belt 46 and the back-up rollers 44, 45 adjusted to at most 0.01 m/min. The control was made such that the variation of the speed of the casting belt 46 was at most 0.5% to the predetermined value. The position of the casting belt 46 in the widthwise direction was controlled with detection of the position of the side end, such that meandering in the casting belt 46 running for one circle was reduced in 1.5 mm. Further, below the casting die 43, the variation of the position in the vertical direction between the lip end of the casting die and the casting belt 46 was in 200 μm. The casting belt 46 is preferably incorporated in the casting chamber 64 which has air pressure controller (not shown). Further, the temperature in the casting chamber 64 is controlled in the range of −10° C. to 57° C. Note that the solvent vapor is recovered by the recovering device 67, and used as a solvent for preparing the dope after the refinement.

The casting dope 27 is cast from the casting die 43 onto the casting belt 46 circulatory running, so as to form the casting film 69. At the casting, the temperature of the casting dope 27 is preferably controlled in the range of −10° C. to 57° C. Further, in order to stabilize the formation of a bead of the cast dopes, the decompression chamber 68 is preferably provided for controlling the pressure in the back side of the bead. Preferably, the decompression is made such that the pressure of the back side may be 2000 Pa to 10 Pa lower than that of the front side. It is preferable to provide the decompression chamber 68 with a jacket (not shown) for controlling the inner temperature. The temperature of the decompression chamber 68 is not restricted especially. However, the temperature is preferably at least the boiling point of the used organic solvent. Further, aspirators (not shown) may be provided with the decompression chamber 68 so as to be near both side edges of a dope outlet of the casting die 43. Thus the aspiration in both side edges of the bead is made to stabilize the shape of the bead. In this case, the force velocity of the aspiration is preferably in the range of one to one hundred Liter/min.

The drying airs are applied from the air ducts 70, 71, 72 to the casting film 69 conveyed in accordance with running the casting belt 46, such that the evaporation of the solvent may proceed. Although the application of the drying airs changes the surface conditions of the casting film 69, the air shielding plate 73 reduces the change of the surface condition. Note that the surface temperature of the casting belt 46 is preferably in the range of −20° C. to 40° C.

When the cast dope has self-supporting property, the casting film 69 is continuously peeled as wet film 74 with support of the peel roller 75. The solvent content at the peeling is preferably in the range of 20 mass % to 250 mass % to the solid content. Then the wet film 74 is transported in the transfer area 80 in which many rollers are provided, and thus transported into the tenter device 47.

In the transfer area 80, while the wet film 74 is transported with the support of the pass rollers, a drying air is fed from the air blower to dry the wet film 74, such that the drying may proceed. Preferably, the temperature of the drying air is in the range of 20° C. to 250° C. Note in the transfer area 80 that the rotating speed of the pass roller may be set to be higher in the downstream side, so as to draw the wet film 74.

In the present invention, the tenter device 47 of a simultaneous bi-axial type is used so as to make the stretch of the wet film 74 in a widthwise direction and a relaxation thereof in a longitudinal direction (transporting direction). The conditions of the stretch and the relaxation are adjusted such that the in-plane retardation (Re) and the thickness retardation (Rth) are controlled to respective predetermined values. Thus the retardation ratio can be increased.

Figure 3:
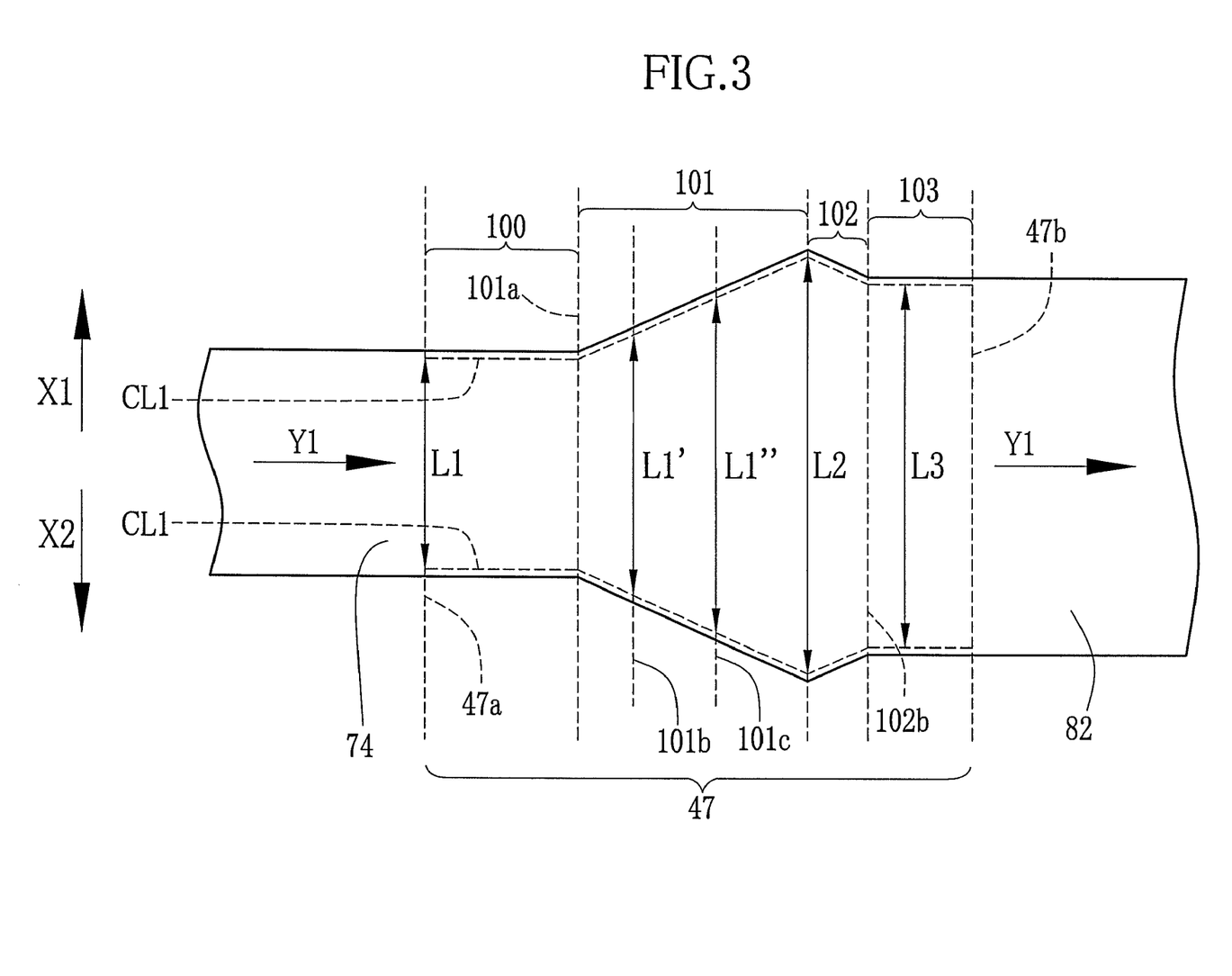
FIG. 3 is a explanatory view of a stretch and a relaxation in a tenter device in FIG. 2.

As shown in FIG. 3, the tenter device 47 is constructed of an entrance section 47, a stretching section 101 in the widthwise direction, a relaxation section 102 in the widthwise direction, and an exit section 103. In order to dry the wet film 74 in the tenter device 47, it is preferable to control the temperature in the tenter device 47 in the range of 60° C. to 160° C. Especially preferably, in order to control the drying condition in each section, the inside of the tenter device 47 is partitioned into plural partitions (for example, 3-5 partitions), and the temperature of each partition is controlled independently. Note that according to the drying conditions in each partition, not only the temperature but also the vapor pressure of the solvent, the velocity of air which attacks to the wet film 74, and the like can be changed.

Further, it is to be noted in FIG. 3 that a track of each clip in both sides of the wet film 74 is shown as a dotted line. In the following explanation, the dotted line is called as a clipping position CL.

At an entrance 47a in the entrance section of the tenter device 47, both side edge portions of the wet film 74 are clipped by clips (not shown). The clips are oppositely disposed in the widthwise direction so as to construct a clip pair (not shown). In this figure, L1 (mm) is a distance of the clip pair in the entrance section 100. Further, the clips are fixed to a chain in the transporting direction, and the chain endlessly runs by nipping with the sprocket. In accordance to the running of the chain, the clips move to transport the wet film 74 from the entrance section 100 toward the stretching section 101. Note that L1 is a distance between the clipping positions CL of both sides of the wet film 47. Further, L1', L1'', L2, L3 that will be explained below are also distances between the clipping positions. CL of both sides of the wet film 47.

At a stretch starting position 101a in the stretching section 101, the stretch of the wet film 74 in the widthwise direction X1, X2 is started. While the stretch of the wet film 74 is made, the distance of the clip pair becomes larger from L1 (mm) to L2 (mm) which is determined as the maximum of the distance of the clip pair. Thereafter, in the relaxation section 102, the relaxation of the wet film 74 in the widthwise direction X1, X2 is made. Thus the distance of the clip pair becomes smaller from L2 (mm) to L3 (mm) which is named final value of the distance of the clip pair. Then in the exit section 103, the distance of the clip pair is kept to L3 (mm) and the wet film 74 is exit as the polymer film 82 through an exit 47b from the tenter device 47.

While the wet film 74 is stretched in the widthwise direction X1, X2, the relaxation is made in the longitudinal direction. The stretch is defined as the application of a tension in the stretching direction. Therefore, if the stretch is made in the widthwise direction the same as in the present invention, the width of the film sometimes becomes larger, sometimes does not change (namely the width is constant), and sometimes becomes smaller (namely the shrinkage of the film in the widthwise direction occurs). Further, in the present invention, the relaxation is defined as the reduction of the stress remaining in the wet film 74. Concretely, the relaxation is to decrease the tension to be applied to the wet film in the widthwise direction X1, X2, to diminish the tension, to keep the temperature of the wet film 74 or the atmosphere around the wet film 74, and the like. Therefore, the relaxation is not limited especially, so far as the remaining stress in the wet film 74 can be reduced.

In the present invention, while the wet film 74 is stretched in the widthwise direction X1, X2, the relaxation in the longitudinal direction Y1 is performed. Thus the tension in the longitudinal direction Y1 that occurs during the stretch is reduced. Thus the orientation of polymer molecules in the wet film 74 is controlled such that the in-plane retardation (Re) is increased and the thickness retardation (Rth) is decreased. There are several types of the clips for the relaxation in the longitudinal direction Y1. For example, there is a slide type clip, and a clipping portion of the slide type clip is unlocked to move in the longitudinal direction Y1 of the wet film 74. As the concretely type of the clip, there is a roller clip, an abacus bead clip, a belt clip, a drum-shaped roller clip a discus clip, and a slide clip movable in the longitudinal direction and in an opposite direction to the longitudinal direction.

As the tenter device 47 to be used in the present invention, there are several sorts other than the type in which the endless change is used to drive the clips. Namely, there are also linear motor type, pantograph type, and the like. The linear motor type is constructed of a carriage having a secondly winding and clips, guide rails for guiding the many carriage in predetermined directions, and a primary winding arranged near each guide rail. Further, since the largeness and the direction of the electric current flowing in the primary winding are controlled, each carriage on the guide rail can be moved at a predetermined speed. The pantograph type is constructed of clips, a guide rail, and a pantograph mechanism disposed between the lips and the guide rail. Since the pantograph mechanism is controlled, the distance between the clips in the longitudinal direction Y1 and the widthwise direction X1, X2 are adjusted. Therefore, the stretch and the relaxation of the wet film 74 in the widthwise direction X1, X2 and the longitudinal direction Y1 can be made even in use of the linear motor type or the pantograph type. The detailed explanation about the tenter devices of the linear motor type is made in Japanese Patent Laid Open Publication No. 2002-507501, H06-57618 and the like. The detailed explanation about the tenter devices of the pantograph type is made in Japanese Patent Laid Open Publication No. 2003-236927 and the like.

In the present invention, an objected stretch ratio R1 of the widthwise direction X1, X2 is defined as $R1=\{(L2-L1)/L1\} \times 100$. The objected stretch ratio R1 is preferably in the range of 10% to 40%, particularly 15% to 35%, and especially 25% to 30%. If the objected stretch ratio R1 is less than 10%, the polymer molecules may be rearranged. In this case, the effect for increasing the in-plane retardation (Re) sometimes becomes smaller. Furthermore, the effect for remedy the defect (such as the wrinkles and creases and the like) which occurs by stretching sometimes becomes smaller. If the objected stretch ratio R1 is more than 40%, the rearrangement of the polymer molecules is excessively made, and therefore the in-plane retardation (Re) becomes too large. Furthermore, the defect sometimes occurs, for example the wet film 74 tears.

When the distance of the clip pair becomes a relaxation starting value L1', the relaxation in the longitudinal direction Y1 is started. The relaxation starting value L1' is previously calculated from a predetermined extent percentage EP1(%) of the stretch in the widthwise direction X1, X2. The value EP (%) is defined as follows:

$$EP1=[(L1'-L1)/(L2-L1)] \times 100$$

Therefore, the relaxation starting value L1' is calculated from the following formula:

$$L1'=[(L2-L1) \times EP/100]+L1$$

In the present invention, the extent percentage EP1 is preferably less than 70%, particularly preferably in the range of 1% to 40%, and especially preferably in the range of 3% to 30%. For example, the minimum L1 (mm) of the distance of the clip pair is 1300 mm, the maximum value L2 (mm) is 1650 mm, and the final value L3 is 1620 mm. In this case the objected stretch ratio R1 is 26.92%. Preferably when the relaxation in the longitudinal direction starts, the relaxation starting value L1' is preferably in the range of 1300 mm (corresponding to 0% of the objected stretch ratio R1) to 1545 mm (corresponding to around 70% of the objected stretch ratio R1), particularly 1303.5 mm (corresponding to 1% of the objected stretch ratio R1) to 1440 mm (corresponding to around 40% of the objected stretch ratio R1), and especially 1310 mm (corresponding to 3% of the objected stretch ratio R1) to 1405 mm (corresponding to around 30% of the objected stretch ratio R1). Note that a stretch end point 101c is determined on the basis of a stretch start point 101b and a relaxation rate RL1 in the longitudinal direction Y1.

Between the stretch start point 101b and the stretch end point 101c, the relaxation of the wet film 74 is made in the longitudinal direction Y1. Thus the polymer molecules are stretched in the widthwise direction X1, X2 and shrink in the longitudinal direction Y1 simultaneously. Therefore, while the in-plane retardation Re increases, the thickness retardation increases smaller than during the stretch of the wet film 74 in the widthwise direction of the prior art.

Figure 6:
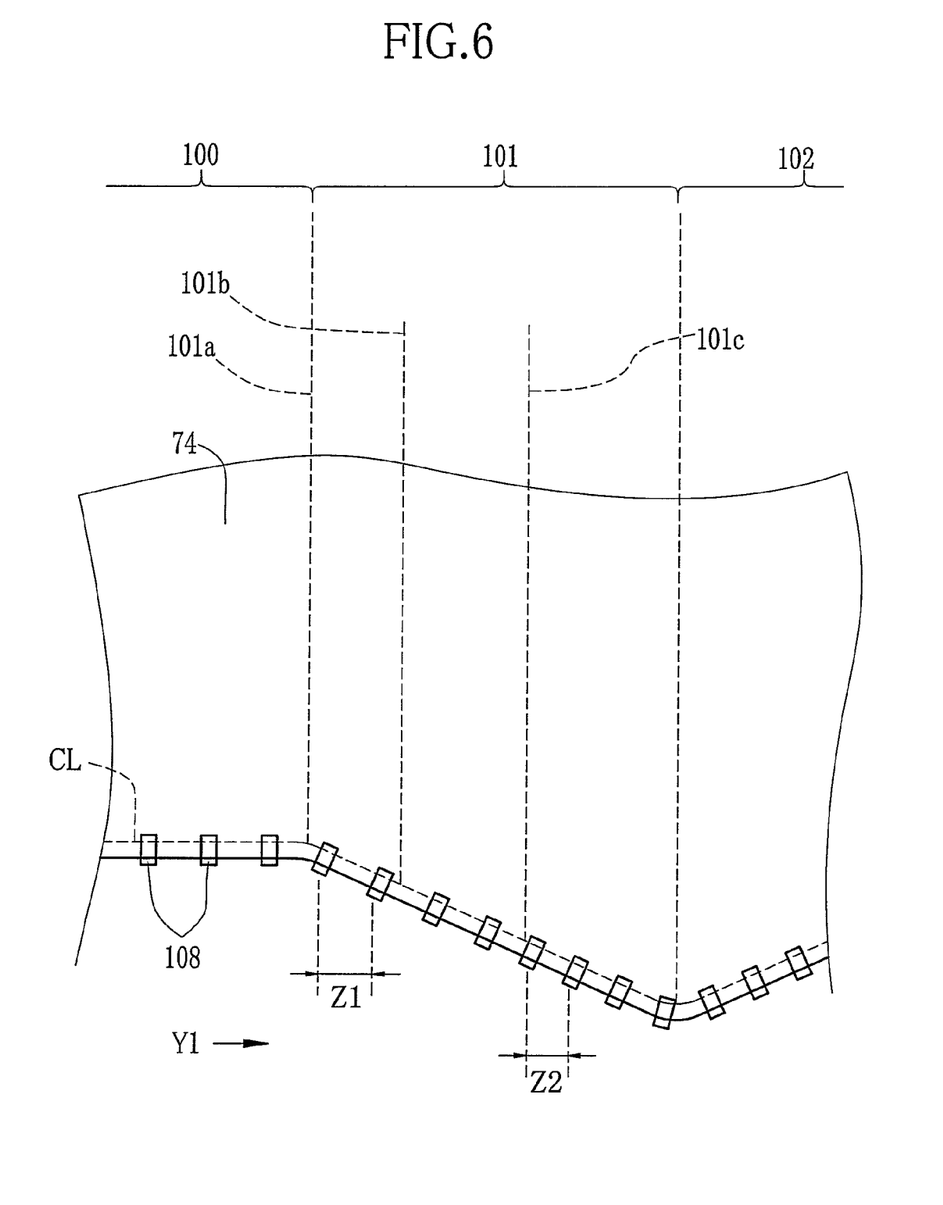
FIG. 6 is an enlarged view of a main part of the tenter device used in the present invention.

As shown in FIG. 6, a relaxation ratio RL1 in the longitudinal direction Y1 is represented as $$RL1=\{(Z1-Z2)/Z1\} \times 100,$$

wherein Z1 is an element in the longitudinal direction Y1 of an interval between the neighboring clips 108 before the relaxation in the longitudinal direction Y1, and Z2 is an element in the longitudinal direction Y1 of an interval between the neighboring clips 108 after the relaxation in the longitudinal direction Y1. Note that Z1 and Z2 may not be defined as the elements in the longitudinal direction Y1 but the interval between the neighboring clips 108.

Thus the relaxation in the longitudinal direction is made between a relaxation start point 101b and the relaxation end point 101c. Thus the stretching of the polymer molecule in the widthwise direction and the relaxation thereof in the widthwise direction are made. Therefore, the in-plane retardation Re becomes larger. Further, in this case; the thickness does not change so much as the normal stretch in the widthwise direction.

The relaxation ratio RL1 is not restricted especially. However, it is preferably in the range of 1% to 5%, particularly preferably 2% to 5%, and especially preferably 3% to 5%. If the relaxation ratio RL1 is less than 1%, the effect for decreasing the thickness retardation (Rth) is sometimes not enough. If the relaxation ratio RL1 is more than 5%, the slack of the wet film 74 sometimes occurs, which causes the troubles of production, such as inability to transport and the like.

The speed of the relaxation in the longitudinal direction, namely the change of the relaxation ratio RL1 in a unit time (one second) is preferably in the range of 0.015%/sec to 2.000%/sec, particularly 0.050%/sec to 1.000%/sec.

Further, at the starting of the relaxation in the longitudinal direction, the content of the remaining solvent in the wet film 47 is preferably in the range of 5 mass % to 150 mass %, particularly preferably 10 wt. % to 100 wt. %, and especially preferably 15 wt. % to 50 wt. %. Herein, the content of remaining solvent on the dry basis is calculated from $\{(x-y)/y\} \times 100$, when the weight of the sampled film is x at the sampling and y after the drying of the sampled film. If the content of the remaining solvent is less than 5 wt. %, the wet film 74 is dried too much, and therefore it becomes difficult to reorientate the polymer molecules. As the result thereof, the effect for decreasing thickness retardation (Rth) may become smaller. If the content of the remaining solvent is more than 150 mass %, the orientation of the polymer molecules becomes unstable, and therefore, the effect for increasing in-plane retardation (Re) may become smaller. Further, in this case, the flexibility of the wet film 74 is too low, and therefore the surface conditions of the produced film may be worse by making the stretch in the widthwise direction and the relaxation in the longitudinal direction.

Further, the temperature in the tenter device 47 during the relaxation in the longitudinal direction is preferably 60° C. to 160° C., particularly 80° C. to 150° C., and especially 100° C. to 150° C.

Further, the relaxation start point 101b and the relaxation end point 101c may be plural, so as to make the relaxation in the longitudinal direction several times. In this case, the relaxation ratio RL1 may be a total of relaxation ratio RL1s of the relaxations performed several times, and otherwise, may be the relaxation ratio RL1 between the most upstream relaxation start point 101b and the most downstream relaxation end point 101c. Further, although the relaxation end point 101c is positioned in the stretching section 101 in FIG. 6, it may be also positioned in the relaxation section 102.

As an example of physical properties of the polymer film 82 obtained by the above method, the thickness is in the range of 60 μm to 110 μm, the in-plane retardation (Re) is in the range of 5 nm to 150 nm, and the thickness retardation (Rth) is in the range of 40 nm to 250 nm.

As shown in FIG. 3, the wet film 74 is dried until the content of the remaining solvent become the predetermined value, and fed out as the polymer film 82 from the tenter device 47 toward the edge slitting device 50 for slitting off both side edge portions. The slit side edge portions are sent to the crusher 90 by a cutter blower (not shown), and crushed to tips by the crusher 90. The tips are reused for preparing the dope, which is effective in view of the decrease of the production cost. Note that the slitting process of both side edge portions may be omitted. However, it is preferable to perform the slitting between the casting process and the winding process.

The polymer film 82 whose side edge portions are slit off is sent to a drying chamber 51 and dried furthermore. In the drying chamber 51, the polymer film 82 is transported with lapping on the rollers 91. The inner temperature of the drying chamber 51 is not restricted especially. However, it is preferable in the range of 50° C. to 160° C. The solvent vapor evaporated from the polymer film 82 by the drying chamber 51 is adsorbed by the recovering device 92. The air from which the solvent components are removed is reused for the drying air in the drying chamber 51. Note that the drying chamber 51 preferably has plural partitions for variation of the drying temperature. Further, a pre-drying chamber (not shown) is provided between the edge slitting device 50 and the drying chamber 51, so as to perform the pre-drying of the polymer film 82. Thus it is prevented that the temperature of the polymer film 82 increases rapidly, and therefore the change of the shape of the polymer film 82 is reduced.

The polymer film 82 is transported into the cooling chamber 52, and cooled therein to around the room temperature. A humidity control chamber (not shown) may be provided for conditioning the humidity between the drying chamber 51 and the cooling chamber 52. Preferably, in the humidity control chamber, an air whose temperature and humidity are controlled is applied to the polymer film 82. Thus the curling of the polymer film 82 and the winding defect in the winding process can be reduced.

Thereafter, the compulsory neutralization device (or a neutralization bar) 93 eliminates the charged electrostatic potential of the polymer film 82 to the predetermined value (for example, in the range of −3 kV to +3 kV). The position of the neutralization process is not restricted in this embodiment. For example, the position may be a predetermined position in the drying section or in the downstream side from the knurling roller 94, and otherwise, the neutralization may be made at plural positions. After the neutralization, the embossing of both side portions of the polymer film 82 is made by the embossing rollers to provide the knurling. The emboss height from the bottom to the top of the embossment is in the range of 1 μm to 200 μm.

In the last process, the polymer film 82 is wound by a winding shaft 95 in the winding chamber 53. At this moment, a tension is applied at the predetermined value to the press roller 96. Preferably, the tension is gradually changed from the start to the end of the winding. In the present invention, the length of the polymer film 82 is preferably at least 100 m. The width of the polymer film 82 is preferably at least 600 mm, and particularly in the range of 1400 mm to 1800 mm. Further, even if the width is more than 1800 mm, the present invention is effective. When it is designated to produce the polymer film 82 which is 15 μm to 100 μm in thickness, the present invention is also applied.

In the solution casting method of the present invention, there are casting methods for casting plural dopes, for example, a co-casting method and a sequential casting method. In the co-casting method, a feed block may be attached to the casting die as in this embodiment, or a multi-manifold type casting die (not shown) may be used. In the production of the film having multi-layer structure, the plural dopes are cast onto a support to form a casting film having a first layer (uppermost layer) and a second layer (lowermost layer). Then in the produced film, at least one of the thickness of the first layer and that of the lowermost layer opposite thereto is preferably in the range of 0.5% to 30% of the total film thickness. Furthermore, when it is designated to perform the co-casting, a dope of higher viscosity is sandwiched by lower-viscosity dopes. Concretely, it is preferable that the dopes for forming the surface layers have lower viscosity than the dope for forming a layer sandwiched by the surface layers. Further, when the co-casting is designated, it is preferable in the bead between a die slit (or die lip) and the support that the composition of alcohol is higher in the two outer dopes than the inner dope.

Japanese Patent Laid-Open Publication No. 2005-104148 describes from [0617] to [0889] in detail about the structures of the casting die, the decompression chamber, the support and the like, and further about the co-casting, the peeling, the stretching, the drying conditions in each process, the handling method, the curling, the winding method after the correction of planarity, the solvent recovering method, the film recovering method. The descriptions thereof can be applied to the present invention.

[Properties & Measuring Method]
(Degree of Curl & Thickness)

Japanese Patent Laid-Open Publication No. 2005-104148 describes from [0112] to [0139] about the properties of the wound cellulose acylate film and the measuring method thereof. The properties and the measuring methods can be applied to the present invention.

[Surface Treatment]

The cellulose acylate film is preferably used in several ways after the surface treatment of at least one surface. The preferable surface treatments are vacuum glow discharge, plasma discharge under the atmospheric pressure, UV-light irradiation, corona discharge, flame treatment, acid treatment and alkali treatment. Further it is preferable to make one of these sorts of the surface treatments.

[Functional Layer]
(Antistatic, Curing, Antireflection, Easily Adhesive & Antiglare Layers)

The cellulose acylate film may be provided with an undercoating layer on at least one of the surfaces, and used in the several ways.

It is preferable to use the cellulose acylate film as a base film to which at least one of functional layers may be provided. The preferable functional layers are an antistatic layer, a cured resin layer, an antireflection layer, an easily adhesive layer, an antiglare layer and an optical compensation layer.

Conditions and Methods for forming the functional layer are described in detail from [0890] to [1087] of Japanese Patent Laid-Open Publication No. 2005-104148, which can be applied to the present invention. Thus, the produced film can have several functions and properties.

These functional layers preferably contain at least one sort of surfactants in the range of 0.1 mg/m$^2$ to 1000 mg/m$^2$. Further, the functional layers preferably contain at least one sort of lubricants in the range of 0.1 mg/m$^2$ to 1000 mg/m$^2$. The functional layers preferably contain at least one sort of matting agents in the range of 0.1 mg/m$^2$ to 1000 mg/m$^2$. The functional layers preferably contain at least one sort of antistatic agents in the range of 1 mg/m$^2$ to 1000 mg/m$^2$.

(Variety of Use)

The produced cellulose acylate film can be effectively used as a protection film for a polarizing filter. In the polarizing filter, the cellulose acylate film is adhered to a polarizer. Usually, two polarizing filters are adhered to a liquid crystal layer such that the liquid crystal display may be produced. Note that the arrangement of the liquid crystal layer and the polarizing filters are not restricted in it, and several arrangements already known are possible. Japanese Patent Laid-Open Publication No. 2005-104148 discloses from [1088] to [1265] the liquid crystal displays of TN type, STN type, VA type, OCB type, reflective type, and other types in detail. The description may be applied to the present invention. Further, in this publication No. 2005-104148 describes a cellulose acylate film provided with an optical anisotropic layer and that having antireflection and antiglare functions. Further, the produced film can be used as an optical compensation film since being double axial cellulose acylate film provided with adequate optical properties. Further, the optical compensation film can be used as a protective film for a polarizing filter. The detail description thereof is made from [1088] to [1265] in the publication No. 2005-104148.

In the method of forming the polymer film of the present invention, the formed cellulose acylate film is excellent in optical properties. The TAC film can be used as the protective film for the polarizing filter, a base film of the photosensitive material, and the like. Further, in order to improve the view angular dependence of the liquid crystal display (used for the television and the like), the produced film can be also used for the optical compensation film. Especially, the produced film is effectively used when it doubles as protective film for the polarizing filter. Therefore, the film is not only used in the TN-mode as prior mode, but also IPS-mode, OCB-mode, VA-mode and the like. Further, the polarizing filter may be constructed so as to have the protective film as construction element.

Further, in the present invention, the stretch of the set film 74 in the widthwise direction and the relaxation in the lengthwise direction are made with use of the tenter device 47 in off-line.

Experiment 1

In followings, an experiment of the present invention will be explained. However, the present invention is not restricted in it. The explanation will be made in detail according to Example 1. In Example 2 and Examples 3-6 as Comparisons, the same explanations will be omitted as Example 1.

Example 1

| | |
|---|---|
| Cellulose Acetate Propionate | 100 pts. wt. |
| (Powder: degree of acetylation, 1.00; degree of propionyl substitution, 1.70; degree of total substitution, 2.70; viscosity-average degree of polymerization, 260; water content, 0.2 wt. %; viscosity of 6 wt. % dichloromethane solution, 150 mPa · s; averaged particle diameter, 1.5 mm; standard deviation of averaged particle diameter, 0.4 mm) | |
| Dichloromethane (first solvent compound) | 320 pts. wt. |
| Methanol (second solvent compound) | 83 pts. wt. |
| 1-butanol (third solvent comound) | 3 pts. wt. |
| Plasticizer A (trimphenyl phosphate) | 7.6 pts. wt. |
| Plasticizer B (diphenyl phosphate) | 3.8 pts. wt. |
| UV-absorbing agent A | 0.7 pts. wt. |
| (2(2'-hydroxy-3',5'-di-tert-butylphenyl)benzotriazol) | |
| UV-absorbing agent B | 0.3 pts. wt. |
| (2(2'-hydroxy-3',5'-di-tert-amylphenyl)-5-chlorobenzotriazol) | |
| Mixture of citric acid esters | 0.006 pts. wt. |
| (Mixture of citric acid, citric acid monoethyl ester, citric acid dimethyl ester, citric acid triethyl ester) | |
| Particles (silicon dioxide particle diameter, 15 nm; Mohs Hardness, about 7) | 0.05 pts. wt. |

[Cellulosetriacetate]

According to cellulose triacetate propionate (CAP) used in this experiment, the content of remaining acetic acid was at most 0.1 wt. %, the content of remaining propionic acid was at most 0.1 wt. %, the Ca content was 60 ppm, the Mg content was 10 ppm, the Fe content was 0.2 ppm, and the sulfur content, in sulfuric group was 65 ppm. The degree of acetylation (or substitution for hydrogen) at $6^{th}$ position atom was 0.32, the degree of substitution of propionyl group at $6^{th}$ position was 0.58, and the percentage of acetyl groups at $6^{th}$ position to the total acetyl groups was 33%. The extract with methanol was 5 wt. %, and a ratio of weight-average molecular weight to number-average molecular weight was 2.5. Further, yellow index was 1.3, haze was 0.08, and transparency was 92.9%. Tg (measured by DSC) was 133° C. This CAP is synthesized from cellulose as material obtained from broad leaf tree.

(1-1) Preparation of Dope

The casting dope 27 was prepared in the dope production line 10 of FIG. 2. The mixing tank had first and second stirrers 22, 24 and was made of stainless and 4000 L in volume. Into the mixing tank, plural solvent compounds were mixed such that a mixture solvent was obtained. Note that the water content in each solvent compound is at most 0.5 mass. The stirring was made with use of the first stirrer 22 having the anchor blade and the second stirrer 24 which was eccentric stirrer of dissolver type. At first, the first stirrer 22 performed the stirring at one m/sec as circumferential velocity, and the second stirrer 24 performed the stirring at shear rate at first 5 m/sec. Thus the dispersion was made for 30 minutes during the stirring. The dissolving started at 25° C., and the temperature of the dispersion became 48° C. at last. While the stirring of the mixture solvent was made, the cellulose triacetate flakes were added from the hopper 13 to the mixture solvent gradually, such that the total mass of the mixture solution and the cellulose triacetate flakes might be 2000 kg. After the dispersion, the high speed stirring (of the second stirrer 24) was stopped, and the stirring was performed by the first stirrer 22 at 0.5 m/sec as circumferential velocity for 100 minutes. Thus CAP flakes was swollen such that the swelling liquid was obtained. Until the end of the swelling, the inner pressure of the mixing tank was increased to 0.12 MPa with use of nitrogen gas. At this moment, the hydrogen concentration in the mixing tank was less than 2 vol. %, which does not cause the explosion. Further, water content in the dope was 0.3 mass.

(1-2) Dissolution & Filtration

The swelling liquid 25 was fed by the pump 26 to the heating device 15 which is the tube with the jacket, and heated to 50° C., and thereafter heated under the application of pressure at 2 MPa to 90° C. Thus the dissolving was made completely. The heating time was 15 minutes. The temperature of the swelling liquid is decreased to 36° C. by the temperature controlling device 16, and then filtrated through the filtration device 17 having filtration material whose nominal diameter was 8 μm. At this moment, the upstream side filtration pressure was 1.5 MPa, and the downstream side filtration pressure was 1.2 MPa. Since the filter, the housing and the pipes were made of hastelloy alloy (trade name) and had jacket for using at high temperature, they were made from materials excellent in corrosion resistance.

(1-3) Concentration, Filtration, Defoaming & Additive

The dope was fed into the flushing device whose pressure was kept to the atmospheric pressure at 80° C., such that the flush evaporation of the dope was made. The solvent vapor was condensed by the condenser to the liquid state, and recovered by the recovering device 32. After the flushing, the content of solid compounds in the dope was 21.8 wt. %. Note that the recovered solvent was refined and recycled by the refining device 33 and reused. The anchor blade is provided at a center shaft of a flush tank of the flushing device 50, and the dope was stirred by the anchor blade at 0.5 m/sec as circumferential velocity. The temperature of the dope in the flush tank was 25° C., the retaining period of the dope in the flush tank was 50 minutes. Part of the dope was sampled, and the measurement of the shearing viscosity was made at 25° C. The shearing viscosity was 450 Pa·s at 10 (1/s) of shearing rate.

Then the defoaming was further made by irradiating very weak ultrasonic waves. Thereafter, the dope was fed to the filtration device 31 by the pump 34 under the application of pressure at 1.5 MPa. In the filtration device 31, the dope was fed at first through a sintered fiber metal filter whose nominal diameter was 10 μm, and then through the same filter of 10 μm nominal diameter. At the forward and latter filters, the upstream pressures were respectively 1.5 MPa and 1.2 MPa, and the downstream pressures were respectively 1.0 MPa and 0.8 MPa. The temperature of the dope after the filtration was controlled to 36° C., and stored as the casting dope 27 in the stainless stock tank 41 whose volume was 2000 L. The anchor blade is provided to a center shaft of the stock tank 41, and the casting dope 27 was always stirred by the anchor blade at 0.3 m/sec as circumferential velocity. Note that when the concentrating of the dope is made, corrosions of parts or portions contacting to the dope in the devices didn't occur at all.

Further, the mixture solvent A for preparing the additive liquid contained dichloromethane of 86.5 pts. wt., acetone 13 pts.mass, and 1-butanol 0.5 pts. wt.

(1-4) Discharging, Adding, Casting & Bead Decompression

The polymer film 82 was formed in the film production line 40 shown in FIG. 2. The casting dope 27 in the stock tank 41 was fed to the filtration device 42 by the gear pump 62. The pump 62 for increasing the upstream pressures was high accuracy gear pumps and driven to feed the casting dope 27 while the feed back control was made by an inverter motor. Thus the upstream pressure of high accuracy gear pump was controlled to 0.8 MPa. As for the pump 62, volumetric efficiency was 99.2%, and the variation rate of the discharging was at most 0.5%. Further, the discharging pressure was 1.5 MPa.

The width of the casting die 43 was 1.8 m, the flow volume rate of the casting dope 27 near a die lip of the casting die 43 is controlled such that the dried film may be 80 μm in thickness. The casting width of the casting dope 27 from the die lip was 1700 mm. T Further, in order to control the temperature of the casting dope 27 to 36° C., the temperature of the heat transfer medium at an entrance of the jacket was 36° C.

The temperature of the casting die 43 and pipes was kept to 36° C. in the film production. The casting die 43 was the coat hunger type, in which heat bolts for adjusting the film thickness were disposed at the pitch of 20 mm. Thus the film thickness (or the thickness of the casting dope) is automatically controlled by the heat bolt. A profile of the heat volt can be set corresponding to the flow volume rate of the high accuracy gear pump, on the basis of the preset program. Thus the feed back control can be made by the control program on the basis of the profile of an infrared ray thickness meter (not shown) disposed in the film production line 40. The control was made such that, with exception of both side edge portions (20 mm each in the widthwise direction of the produced film), the difference of the film thickness between two positions which were 50 mm far from each other might be at most 1 μm, and the largest difference between the minimal values of the film thickness in the widthwise direction might be at most 3 μm/m. Further, the average film thickness might was controlled in ±1.5%.

The upstream side of the casting die 43 is provided with the decompression chamber 68. The decompression rate of the decompression chamber 68 was controlled in accordance with the casting speed, such that the pressure difference might occur in the range of one Pa to 5000 Pa between the upstream and downstream sides of the bead of the discharged casting dope above the casting die. At this time, the pressure difference between both side of a bead of the discharged casting dope was determined such that the length of the bead might be from 20 mm to 50 mm. Further, an instrument was provided such that the temperature of the decompression chamber 68 might be set to be higher than the condensation temperature of the gas around the casting section. Further, there were labyrinth packings (not shown) in the upstream and downstream sides of the beads. Further, an opening was provided in both edges of the die lip of the casting die 43. Further, an edge suctioning device (not shown) for reducing the disturbance of the bead was provided for the casting die 43.

(1-5) Casting Die

The material of the casting die 43 was the precipitation hardening stainless steel, whose coefficient of thermal (° C.$^{-1}$). In the compulsory corrosion experiment in an electrolyte solution, the corrosion resistance was almost the same as that of SUS316. Further, the material to be used for the casting die 43 had enough corrosion resistance, such that the pitting (or pitting corrosion) might not occur on the gas-liquid interface even if this material were dipped in a mixture liquid of dichloromethane, methanol and water for three months. The finish accuracy of the contact surface of each casting die to the casting dope 27 was at most 1 μm in surface roughness, straightness in any direction was at most 1 μm in surface roughness, and the slit clearance of the die lip was adjusted to 1.5 mm. According to an edge of the contact portion of a lip end of the casting die 43, R is at most 50 μm in all of a width. Further, the shearing rate in the casting die 43 controlled in the range of one to 5000 per second. Further, the WC coating was made on the lip end from the casting die 43 by a melt extrusion method, so as to provide the hardened layer.

In order to prevent the dry and solidification on part of the slit end of the casting die 43, the mixture solvent A dissolvable of the solidified dope was supplied to each edge portion of the gas-liquid interface of the slit at 0.5 ml/min. Thus the mixture solvent is supplied to each bead edge. The pulse rate of a pump for supplying the mixture solvent was at most 5%. Further, the decompression chamber 68 was provided for decreasing the pressure in the rear side by 150 Pa. In order to control the temperature of the decompression chamber 68, a jacket (not shown) was provided, and a heat transfer medium whose temperature was controlled at 35° C. was supplied into the jacket. The edge suction rate could be controlled in the range of 1 L/min to 100 L/min, and was adequately controlled in this experiment so as to be in the range of 30 L/min to 40 L/min.

(1-6) Metal Support

The casting belt 46 was an endless stainless belt which was 2.1 m in width and 70 m in length. The thickness of the casting belt 46 was 1.5 mm, and the surface of the casting belt 46 was polished, such that the surface roughness might be at most 0.05 μm. The material was SUS316, which had enough corrosion resistance and strength. The thickness unevenness of the entire casting belt 46 was at most 0.5% of the predetermined value. The casting belt 46 was moved by rotating the back-up rollers 44, 45. At this moment, the tension of the casting belt 46 was controlled to $1.5 \times 10^5$ N/m$^2$. Further, the relative speed to each roller to the casting belt 46 changed. However, in this experiment, the control was made such that the difference of the relative speed between the back-up rollers 44, 45 was at most 0.01 m/min. Further the control was made such that the variation of the speed of the casting belt 46 was at most 0.5% to the predetermined value. The position of the casting belt 46 in the widthwise direction was controlled with detection of the position of the side end, such that meandering of the casting belt 46 running for one circle was reduced in 1.5 mm. Further, below the casting die 43, the variation of the position in the vertical direction between the lip end of the casting die 43 and the casting belt 46 was in 200 μm. The casting belt 46 is preferably incorporated in the casting chamber 64 which has air pressure controller (not shown). The casting dope was cast onto the casting belt 46 from the casting die 43.

In this experiment, the back-up rollers 44, 45 were supplied therein with a heat transfer medium, such that the temperature of the casting belt 46 might be controlled. The back-up roller 45 disposed in a side of the casting die 43 was supplied with the heat transfer medium (water) at 5° C., and the back-up roller 44 was supplied with the heat transfer medium (water) at 40° C. The surface temperature of the middle portion of the casting belt 46 at a position just before the casting was 15° C., and the temperature difference between both sides of the casting belt 46 was at most 6° C. Note that a number of pinhole (diameter, at least 30 μm) was zero, a number of pinhole (diameter, 10 μm to 30 μm) was at most one in square meter, and a number of pinhole (diameter, less than 10 μm) was at most two in square meter.

(1-7) Casting & Drying

The temperature of the casting chamber 64 was kept to 35° C. At first, the drying air was fed out in parallel to the casting film 69 so as to make the drying. The overall heat transfer coefficient from the drying air to the casting film 69 was 24 kcal/(m²·hr·° C.). Further, the drying air at 135° C. was fed out from the upstream air duct 70 to dry the casting film 69, the drying air at 140° C. was fed out from the downstream air duct 71 to dry the casting film 69, and the drying air at 65° C. was fed out from the lower air duct 72 to dry the casting film 69. The saturation temperature of each drying air was about −8° C. Note that the oxygen concentration in the drying atmosphere on the casting belt 46 was kept to 5 vol % by substituting the air for nitrogen gas. In order to keep the oxygen concentration to 5 vol %, the inner air of the drying atmosphere was substituted by nitrogen gas. The solvent vapor in the casting chamber 64 was recovered by setting the temperature of exit of the condenser 66 to −10° C.

The air shielding plate 73 was disposed such that the drying air might not be applied to the casting film 69 and the bead directly for 5 seconds after the casting. The static pressure fluctuation near the casting die 43 was reduced to at most ±1 Pa. when the mass ratio of the solvent to the casting film 69 became 50 wt. % on dry basis, the casting film 69 was peeled as the wet film 74 from the casting belt 46 with support of the peel roller 75. If the sample weight of the casting film 69 was x and the sample weight after the drying was y, the solvent content on the dry basis (%) was calculated in the formula, {(x−y)/y}×100. Note that in the content of the remaining solvent on dry basis, the weight of the solid obtained by completely drying the dope corresponds to 100%. Further, the peeling tension was 1×10² N/m². In order to reduce the peeling defects, the percentage of the peeling speed (the draw of the peel roller) to the speed of the casting belt 46 was controlled from 100.1% to 110%. The surface temperature of the wet film 74 was 15° C. The drying speed on the casting belt 46 was 60 wt. %/min in average on dry basis. The solvent vapor generated in the evaporation is condensed by the condenser 66 at −10° C. to a liquid state, and recovered by the recovering device 67. The water content of the recovered solvent was adjusted to at most 0.5%. Further, the air from which the solvent components were removed was heated again and reused for the drying air. The wet film 74 was transported with the rollers in the transfer area 80 toward the tenter device 47. In the transfer area 80, the air blower 81 fed the drying air at 40° C. to the wet film 74. Note that the tension about 30N was applied to the wet film 74 in the longitudinal direction of the rollers in the transfer area 80.

(1-8) Transportation in Tenter Device, Drying. Edge Slitting

In the tenter device 47, while both side edge portions of the wet film 74 are held by clips, the drying was made. The clips were cooled by feeding the heat transfer medium at 20° C. The transportation is made with chain, and the moving speed change of sprocket was at most 0.5% from a predetermined speed. Further, the inside of the tenter device 47 is partitioned into three zones. The temperature of the drying air in each zone was 70° C., 130° C., 140° C. from the upstream side. The gas concentration in the drying air at −10° C. was the saturated gas concentration. The averaged drying speed (or solvent evaporation speed) in the tenter device 47 was 120 wt. % on dry basis. The condition of each zone was controlled such that the content of the remaining solvent in the wet film 74 might be 5 wt. % at the exit of the tenter device 47.

In the tenter device 47, the stretch of the wet film 74 in the widthwise direction and the relaxation in the longitudinal direction were made. According to the distance of the clip pair, the minimum L1 (mm) was 1000 mm, the maximum L2 (mm) was 1250 mm. Therefore, the objected stretch ratio R was 25%. Further, the final value L3 (mm) of the distance of the clip pair was 1200 mm. Further, the relaxation in the longitudinal direction was made such that the relaxation ratio RL1 might be 2%. The When the distance was L1' (1050 mm), the relaxation in the longitudinal direction was started. When the relaxation is completed at 2% of the relaxation ratio RL1 in the longitudinal, the distance L" (mm) was 1170 mm. The content of the remaining solvent in the wet film 74 on the dry basis was 40 wt. %. The drawing ratio in percentage from the peel roller 75 to the entrance 47a of the tenter device 47 was 102%.

According to the stretching ratio of the stretch performed in the tenter device 47, the difference of the actual stretching ratio was at most 10% between positions which were at least 10 mm apart from the holding positions of the clips, and at most 5% between positions which were 20 mm apart from the holding portions. In the side edge portions in the tenter device 47, the ratio of the length between the clip starting position and the clip releasing position to that between the entrance 47a and the exit 47b was 90%. The solvent vapor generated in the tenter device 47 was condensed at −10° C. to a liquid state and recovered. For the condensation, a condenser (not shown) was provided, and a temperature at an exit thereof was −8° C. The water content in the recovered solvent was regulated to at most 0.5 wt. %, and then the recovered solvent was reused. The wet film 74 was fed out as the polymer film 82 from the tenter device 47.

In 30 seconds from exit of the tenter device 47, both side edge portions were slit off in the edge slitting device 50. In this experiment, each side portion of 50 mm in the widthwise direction of the polymer film 82 was determined as the side edge portion, which were slit off by an NT type slitter of the edge slitting device 50. The slit side edge portions were sent to the crusher 90 by applying air blow from a blower (not shown), and crushed to tips about 80 mm². The tips were reused as raw material with the CAP frake for the dope production. The oxygen concentration in the drying atmosphere in the tenter device 47 was kept to 5 vol. %. Note that the air was substituted by nitrogen gas in order to keep the oxygen concentration at 5 vol. %. Before the drying at the high temperature in the drying chamber 51, the pre-heating of the polymer film 82 was made in a pre-heating chamber (not shown) in which the air blow at 100° C. was supplied.

(1-9) Final Dry & Elimination

The polymer film 82 was dried at high temperature in the drying chamber 51, which was partitioned into four partitions. Air blows whose temperatures were 120° C., 130° C., 130° C. and 130° C. from the upstream side were fed from air blowers (not shown) to the partitions. The transporting tension of each roller 91 to the polymer film 82 was 100 N/m. The drying was made for ten minutes such that the content of the remaining solvent might be 0.3 wt. %. The lapping angle (center angle of contacting arc) of the roller 4 was 90° and 180°. The rollers 91 were made of aluminum or carbon steel. On the surface, the hard chrome coating was made. The surfaces of the rollers 91 were flat or processed by blast of matting process. The swing of the roller in the rotation was in 50 μm. Further, the bending of the roller 91 at the tension of 100N/m was reduced to at most 0.5 mm.

The solvent vapor contained in the drying air is removed with use of the recovering device 92 in which an adsorbing agent was used. The adsorbing agent was active carbon, and the desorption was performed with use of dried nitrogen. The recovered solvent was reuse as the solvent for the dope preparation after the water content might be at most 0.3 wt. %. The drying air contains not only the solvent vapor but also gasses of the plasticizer, UV-absorbing agent, and materials of high boiling points. Therefore, a cooler for removing by cooling and a preadsorber were used to remove them. Thus the drying air was reused. The ad- and desorption condition was set such that a content of VOC (volatile organic compound) in exhaust gas might be at most 10 ppm. Furthermore, in the entire solvent vapor, the solvent content to be recovered by condensation method was 90 wt. %, and almost of the remaining solvent vapor was recovered by the adsorption recovering.

The polymer film 82 was transported to a first moisture controlling chamber (not shown). In the interval section between the drying chamber 51 and the first moisture controlling chamber, the drying air at 110° C. was fed. In the first moisture controlling chamber, the air whose temperature was 50° C. and dewing point was 20° C. was fed. Further, the polymer film 82 was fed into a second moisture chamber (not shown) in which the curling of the polymer film 82 was reduced. An air whose temperature was 90° C. and humidity was 70% was applied to the polymer film 82 in the second moisture controlling chamber.

(1-10) Knurling, Winding Conditions

After the moisture adjustment, the polymer film 82 was cooled to 30° C. in the cooling chamber 52, and then the edge slitting was performed. The compulsory neutralization device (or a neutralization bar) 93 was provided, such that in the transportation, the charged electrostatic potential of the polymer film 82 might be in the range of −3 kV to +3 kV. Further, the film knurling was made on a surface of each side of the polymer film 82 by the knurling roller 94. The width of the knurling was 10 mm, and the knurling pressure was set such that the maximal thickness might be at most 12 μm larger in average than the averaged thickness.

The polymer film 82 was transported to the winding chamber 53, whose inside temperature and humidity were respectively kept to 28° C. and 70%. Further, a compulsory neutralization device (not shown) was provided, such that the charged electrostatic potential of the film might be in the range of −1.5 kV to +1.5 kV. The obtained polymer film 82 was 80 μm in thick and 1475 mm in width. The diameter of the winding shaft 95 was 169 mm. The tension pattern was set such that the winding tension was 300 N/m at first, and 200 N/m at last. The polymer film 82 was entirely 3940 m in length. The meandering cycle during the winding was 400 m, and the oscillation width was in ±5 mm. Further, the pressure of the press roller 96 to the winding shaft 95 was set to 50 N/m. The temperature of the film at the winding was 25° C., the water content was 1.4 wt. %, and the content of the remaining solvent was 0.3 wt. %. Through all processes, according to the drying speed, 20 wt. % of the solvent in dry weight standard was evaporated per minute in average. Further, the loose winding and wrinkles didn't occur, and the film didn't transit in the film roll even in 10 G impact test. Further, the roll appearance was good.

The film roll was stored under the condition at 25° C. and 55% RH for one month. Furthermore, as result of inspecting in the same manner as above, the change having influence of the film quantity was not recognized. Furthermore there was any adhesion in the film roll. Further, after the polymer film 82 was produced, part of the casting film 69 didn't remain on the casting belt 46 after the peeling.

[Estimation]

(Measurement of In-Plane Retardation (Re))

The polymer film 82 was cut to 70 mm by 100 mm to obtain sample films. Then the sample films were disposed at 25° C. and 60% RH of humidity for two hours, and the extrapolation values of the refractive index were measured according to the perpendicular direction to the sample film with use of 632.8 nm visible ray by an automatic birefringence meter (KOBRA21DH, produced by Oji Scientific Instruments). On the base of the result, the in-plane retardation was calculated from the following formula:

$$Re = |nMD - nTD| \times d \quad (2)$$

Note that "nMD" and "nTD" were refractive indexes in the longitudinal and widthwise directions of the polymer, film 82 respectively. "d" was an average thickness (nm) of the sample film. According to this formula, the in-plane retardation (Re) of the polymer film 82 was 79 nm.

(Measurement of Thickness Retardation (Rth))

The polymer film 82 was cut to 30 mm by 40 mm to obtain sample films. Then the sample films were disposed at 25° C. and 60% RH of humidity for two hours. With use of an ellipsometer (M150, produced by Jasco Corporation), the values of the refractive index was measured according to the perpendicular direction to the sample film, and the extrapolation values of the refractive index were measured with inclining the sample films. The wavelength of the ray used for the measurement was 632.8 nm. On the base of the result, the thickness retardation was calculated from the following formula:

$$Rth = \{(nMD + nTD)/2 - nTH\} \times d \quad (1)$$

Note that "nMD", "nTD" and "nTH" were refractive indexes in the longitudinal (casting), widthwise, and thickness directions of the sample film respectively. "d" was an average thickness (nm) of the sample film. According to this formula, the thickness retardation (Rth) of the polymer film 82 was 185 nm.

Example 2

In Experiment 2, the objective stretch ratio R1 in the widthwise direction was 15%. When the extent percentage to the objected stretch ratio R1 was 6%, the relaxation in the longitudinal direction was started. At this time the content of the remaining solvent on the dry basis in the wet film 74 was 15 wt. %. When the relaxation ratio RL1 becomes 2%, the relaxation was completed. Other conditions were the same as Experiment 1. The obtained data was used for calculating the in-plane retardation Re and the thickness retardation Rth, which were respectively 59 nm and 169 nm.

Comparisons

Examples 3-6

In Comparisons, the objective stretch ratio was 30% in Example 3, 25% in Example 4, 15% in Example 5, and 35% in Example 6. The relaxation in the longitudinal direction was not made in Examples 3-6. Other conditions were the same as Example 1. The obtained data was used for calculating the in-plane retardation Re and the thickness retardation Rth. In Example 3, the values Re and Rth were respectively 80 nm and 200 nm. In Example 4, the values Re and Rth were respectively 73 nm and 195 nm. In Example 5, the values Re and Rth were respectively 51 nm and 178 nm. In Example 6, the values Re and Rth were respectively 87 nm and 205 nm.

Figure 4:
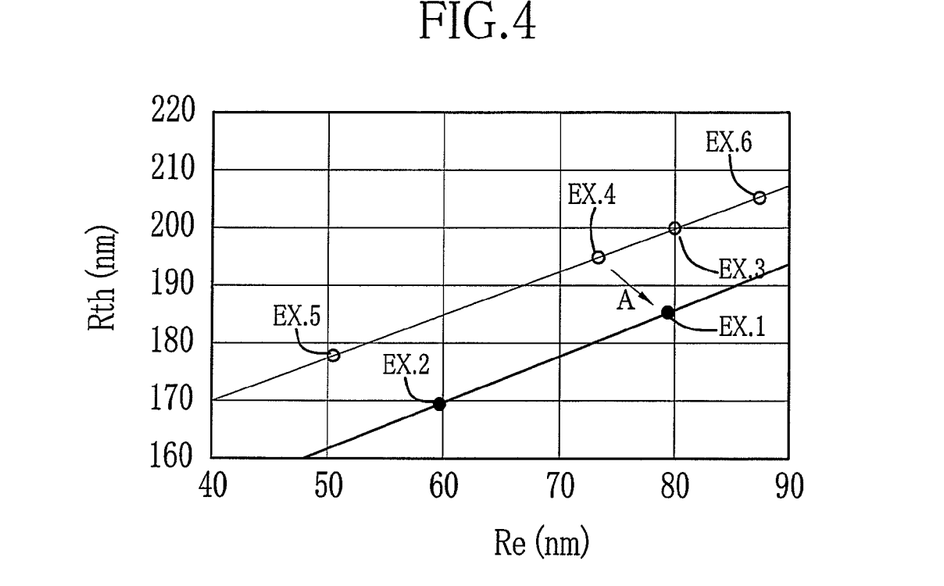
FIG. 4 is a graph of a relation between an in-plane retardation Re and a thickness retardation Rth of each film.
Figure 5:
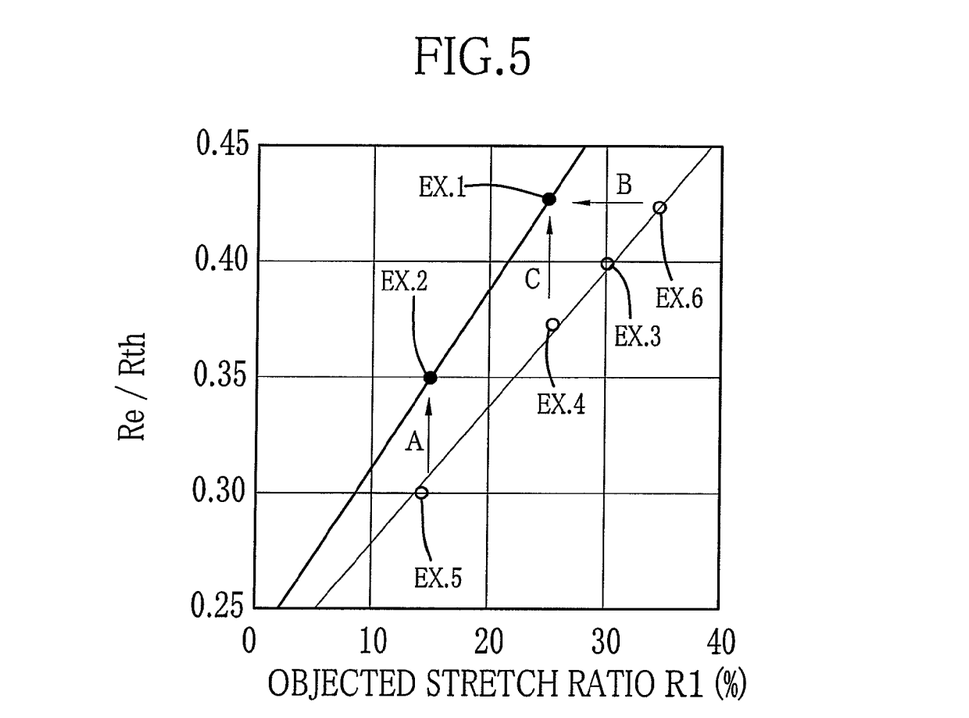
FIG. 5 is a graph of a relation between a stretch ratio in a widthwise direction of the film and a retardation ratio of Re/Rth.

On the basis of the results of Examples 1-2 (with the relaxation during the stretch) and Examples 3-6 (without the relaxation during the stretch), a correlation between the in-plane retardation Re and the thickness retardation Rth is shown in FIG. 4, and a correlation between the objective stretch ratio and a retardation ratio (Re/Rth) is shown in FIG. 5.

As shown in FIG. 4, at the same value of the thickness retardation Rth, the in-plane retardation of the line of Examples 1-2 is higher than that of Examples 3-6. Especially, in Example 4, the relaxation in the longitudinal direction was not made during the stretch in the widthwise direction, and other conditions were the same as Example 1. In comparison of Example 1 to Example 4, as shown with arrow A, if the relaxation in the longitudinal direction is made during the stretch in the widthwise direction, the in-plane retardation Re increased and the thickness retardation Rth decreased.

As shown in FIG. 5, if the relaxation is not made during the stretch, the objected stretch ratio R1 must be 35% of Example 6 in order to obtain the same value Re/Rth as Example 1. However, in Example 6, the transparency of the film became bad. Therefore, as shown by an arrow B, the relaxation in the longitudinal direction during the stretch in the widthwise direction increases the retardation ratio (Re/Rth) even if the objected stretch ratio R1 is low. Further, as shown in an arrow C, the relaxation during the stretch increases the retardation ratio Re/Rth.

If the stretching of the film is made at the high stretch ratio, the transparency of the film sometimes becomes lower, and in this case, the film cannot be used for a display. However, in the present invention, the relaxation in the longitudinal direction is made during the stretch in the widthwise direction. As the result, even if the stretch ratio is low, the in-plane retardation Re increases and the thickness retardation Rth decrease, so as to be preferable without decrease of the transparency of the film.

Various changes and modifications are possible in the present invention and may be understood to be within the present invention.

The invention claimed is:

1. A solution casting method comprising steps of:
    casting from a casting die onto a support a casting dope containing polymer and solvent, so as to form a casting film;
    peeling said casting film as a film from said support;
    drying said film;
    stretching said film in a widthwise direction thereof during the drying;
    performing during the stretch a relaxation of said film in a longitudinal direction thereof,
    wherein the relaxation of said wet film is started when a stretch ratio is in the range from 20% to less than 70% of an objected value.

2. A solution casting method as described in claim 1, wherein a relaxation ratio of said wet film by the relaxation in said longitudinal direction is in the range of 1% to 5%.

3. A solution casting method as described in claim 1, wherein when a content of remaining solvent in said wet film on the dry basis is in the range of 5 wt. % to 150 wt. %, the relaxation of said wet film is started.

4. A solution casting method as described in claim 1, wherein a stretch ratio of the stretch is in the range of 10% to 40%.

5. A solution casting method as described in claim 1, wherein said polymer is at least one of cellulose triacetate, cellulose acetate propionate, and cellulose acetate butylate.

6. A solution casting method as described in claim 5, wherein an in-plane retardation Re of said film after the drying is in the range of 5 nm to 150 nm and a thickness retardation Rth is in the range of 40 nm to 250 nm.

7. A solution casting method as described in claim 1, wherein said film is used for an optical functional film.

* * * * *